United States Patent [19]

Ayers et al.

[11] 3,948,699

[45] Apr. 6, 1976

[54] HYDROGEN GAS GENERATORS FOR USE IN CHEMICAL LASERS

[75] Inventors: Orval E. Ayers, Huntsville; Roy E. Patrick, Redstone Arsenal, both of Ala.

[73] Assignee: The United States of America as represented by the Secretary of the Army, Washington, D.C.

[22] Filed: Nov. 8, 1974

[21] Appl. No.: 522,156

[52] U.S. Cl. ............... 149/22; 149/87; 149/109.2; 423/295; 423/648
[51] Int. Cl.² ............... C06B 43/00; C06B 27/00; C06B 23/00; C01B 6/10
[58] Field of Search ....... 149/109.2, 109.4, DIG. 34, 149/22, 87, 37; 423/644, 645, 646, 647, 648, 656, 294, 295; 23/302, 303; 252/375

[56] References Cited
UNITED STATES PATENTS

| | | | |
|---|---|---|---|
| 3,108,431 | 10/1963 | Armstrong | 149/109.2 |
| 3,624,117 | 11/1971 | Bartoszek | 149/22 |
| 3,666,672 | 5/1972 | Hiltz | 149/22 |
| 3,734,863 | 5/1973 | Beckert | 423/646 |
| 3,751,566 | 8/1973 | Churchill | 423/645 |
| 3,819,808 | 6/1974 | Mattson | 423/644 |
| 3,862,052 | 1/1975 | Beckert | 423/646 |
| 3,864,465 | 2/1975 | Hoffert | 423/648 |
| 3,880,987 | 4/1975 | Nahas | 423/648 |
| 3,883,644 | 5/1975 | Matzek | 149/87 |

*Primary Examiner*—Leland A. Sebastian
*Assistant Examiner*—Donald P. Walsh
*Attorney, Agent, or Firm*—Nathan Edelberg; Robert P. Gibson; Jack W. Voigt

[57] ABSTRACT

A storable solid propellant composition based on complex metal boron compounds of the general formula $M(BH_4)_x$ or $M(BD_4)_x$, (where M equals a metal and x equals the valence of the metal M; M is an alkali metal or an alkali earth metal; H is hydrogen, and D is deuterium) and metal oxides of the general formula $Q_2O_3$ (where Q is a trivalent metal selected from iron, aluminum, gallium cobalt, and indium) combined stoichiometrically. The stoichiometric blend is employed in a method for producing high temperature (e.g. 600°C–700°C) hydrogen or deuterium that is acceptable for use in HF/DF and HCl chemical lasers, the gas dynamic laser (GDL), or a source to generate chemically pure and hot hydrogen gas as a reducing fuel.

8 Claims, No Drawings

HYDROGEN GAS GENERATORS FOR USE IN CHEMICAL LASERS

CROSS-REFERENCE TO RELATED APPLICATION

The compositions and method of this invention relates to our concurrently filed U.S. Patent application tilted: "Method for Producing High Temperature Hydrogen."

BACKGROUND OF THE INVENTION

This invention relates to the laser fuels, hydrogen or deuterium, and to solid compositions from which the fuels can be produced.

Since hydrogen gas contained in compressed gas cylinders has been widely used in industry as a source of hydrogen for many industrial processes, this source has been considered and evaluated for laser uses. However, the handling of high pressure compressed hydrogen gas or hydrogen under cryogenic conditions is not acceptable in meeting the requirements for use in chemical lasers.

Chemical lasers require the highest level of purity of reactants which react to form a chemical compound that is in an excited energy state. The excited compound emits coherent radiation energy while returning to ground state.

The prior art method of employing compounds such as lithium aluminum hydride, sodium borohydride, and the like as a source of hydrogen generally requires a catalyst to effect decomposition. Introduction of the catalyst to initiate decomposition provides an opportunity to contaminate the hydrogen gas generated.

Desirable would be a storable solid propellant composition which can be employed in a method to yield high purity hydrogen from a self sustaining reaction once the reaction is initiated. Also desirable would be a composition which can be employed in a method to yield high purity deuterium from a self-sustaining reaction once the reaction is initiated. Thus, both desirable and required is a method which includes a reaction initiation step which does not introduce impurities for contaminating the liberated hydrogen or deuterium.

Therefore, an object of this invention is to provide a composition and a method for generating hydrogen for use in chemical lasers.

Another object of this invention is to provide a composition and a method for generating deuterium for use in chemical lasers.

A further object of this invention is to provide a solid chemical composition and a method which yields high temperature and high purity hydrogen gas for immediate use in chemical lasers. It is also an object of this invention to provide a solid chemical composition and a method which yields high temperature and high purity deuterium gas for immediate use in chemical lasers.

SUMMARY OF THE INVENTION

A solid propellant composition comprised of stoichiometric amounts of a complex metal borohydride and moisture free trivalent metal oxide is prepared by mixing to achieve uniformity in a blending mill and then pressing into pellets or into metal canisters. When the described solid propellant composition is provided with sufficient heat to effect initiation of a decomposition reaction, the continued decomposition reaction is self-sustaining for producing hydrogen gas having a high temperature and high purity which meets the requirement for immediate use in a chemical laser. Similarly, a complex metal borodeuteride is used to produce hot deuterium gas.

DESCRIPTION OF THE PREFERRED EMBODIMENT

The preferred embodiments of this invention employ moisture free trivalent metal oxide of iron or aluminum. Moisture free ferric oxide is prepared by drying hydrated ferric oxide in a furnace at a temperature at least 10 percent higher than that needed to remove water of hydration, i.e. $Fe_2O_3 \cdot XH_2O$, wherein X is the number of molecules water of hydration. $Fe_2O_3$ loses water of hydration at about 500°C and, therefore should be dried at 550°C or above. The metal oxide is then combined stoichiometrically with a complex metal borohydride according to the following reaction equation (where x equals valence of metal (M) in the complex borohydride):

$$3M(BH_4)_x + 2(x) Fe_2O_3 \rightarrow 3M(BO_2)_x + 4(x) Fe + 6(x) H_2$$

The above reaction produces a temperature sufficient for self-sustaining of the reaction after the reaction is initiated. The reaction temperature is in the 600°C–700°C range; thus, the temperature of the hydrogen or deuterium produced is released at about this temperature level.

GENERAL EXAMPLE

A mixture of the complex metal borohydride (3 moles) and $Fe_2O_3$ (2 moles) is uniformly ground and mixed with a mortar and pestle for small formulations or in a blending mill for large quantities until it is uniformly mixed. The mixed powder is then pressed into pellets or into metal canisters with a press using pressures up to 10,000 psig. The pellets and canisters can be made in any diameter and length to produce small or large volumes of hot hydrogen gas. The volume of gas per second being evolved is determined by the diameter of the propellant grain and its burning rate.

The following specific examples illustrate this invention and its use for generation of hot hydrogen gas. Where deuterium gas is desired, a complex metal borodeuteride is employed in the reaction in place of a complex metal borohydride.

SPECIFIC EXAMPLE I 1.48g dried $Fe_2O_3$ are weighed out and mixed with 0.52g of $NaBH_4$. The mixture is then ground with a mortar and pestle. Using a hydraulic press and a 1.25 inch diameter die, the powder is pressed into a pellet under 2500 psig pressure. The pellet is then placed in a nitrogen atmosphere reaction vessel which has a known volume and which has been fitted with a pressure gauge. Inside the vessel the pellet is rested on a nickel-chromium ignition wire (80 percent nickel and 20 percent chromium), to which 10 volts at about 10 amps is applied to produce enough heat to initiate a reaction in the pellet which is self-sustaining, once started. After the vessel is cooled to room temperature, the pressure is recorded and the amount of $H_2$ produced is calculated using the known volume, temperature, and pressure.

The reaction in the vessel compared with the stoichiometric reaction:

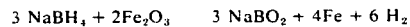

From this equation the amount of hydrogen that should have been produced was calculated and compared with the amount that was produced experimentally. The equation shows that using 0.52g of $NaBH_4$ in a 2.0g pellet, 604 ml of $H_2$ at STP should be produced. The pellet actually gave 590 ml of $H_2$ at STP, a yield of 97 percent. A gravimetric analysis of the combusted pellet showed that the solid waste also corresponds to the stoichiometric equation.

SPECIFIC EXAMPLE II

A pellet containing $Al_2O_3$ was made according to the stoichiometric reaction:

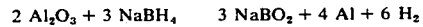

It was fired as in Specific Example I under similar condition except the nickel-chromium wire had to be heated for a longer period of time than in Specific Example I. From the equation 846 ml of $H_2$ at STP should have been produced as compared to 788 ml which was produced by the pellet, a yield of 92 percent.

The complex boron compounds of this invention can include a metal from the alkali metals and the alkali earth metals. Also, this invention is not limited to a complex borohydride containing hydrogen with an atomic weight of one, but also may include borodeuteride containing deuterium which has an atomic weight of two. Also this invention is not limited to the production of hydrogen and deuterium for use in the chemical and gas dynamic lasers, but may be used to generate chemically pure and hot hydrogen gas as a reducing fuel.

We claim:

1. A solid propellant composition that produces high temperature, chemically pure hydrogen or deuterium from a self-sustaining reaction after said reaction is initiated by a heat source sufficient to initiate said reaction, said solid propellant composition comprising a uniform mixture of a stoichiometric amount of trivalent metal oxide of the formula $Q_2O_3$, where Q is a trivalent metal selected from iron, aluminum, gallium, cobalt, and indium, said trivalent metal oxide rendered moisture free by drying at a temperature at least 10 percent above that temperature needed to remove water of hydration, and a stoichiometric amount of a complex boron compound selected from the complex boron compounds having the formulas: $M(BH_4)_x$ and $M(BD_4)_x$, wherein x is the valence of the metal (M), M is an alkali metal or an alkali earth metal, H is hydrogen, and D is deuterium, said stoichiometric amount being based on the reaction:

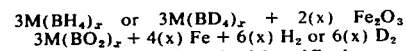

wherein x is as previously identified.

2. The solid propellant composition of claim 1 wherein said M of said complex boron compound is Na and wherein x of said complex boron compound is one, said selected complex boron compound being the compound $NaBH_4$, and wherein said trivalent metal oxide is $Fe_2O_3$.

3. The solid propellant composition of claim 1 wherein said M of said complex boron compound is Na and wherein x of said complex boron compound is one, said selected complex boron compound being the compound $NaBD_4$, and wherein said trivalent metal oxide is $Fe_2O_3$.

4. The solid propellant composition of claim 1 wherein said M of said complex boron compound is Na and wherein x of said complex boron compound is one, said selected complex boron compound being the compound $NaBH_4$, and wherein said trivalent metal oxide is $Al_2O_3$.

5. The solid propellant composition of claim 1 wherein said M of said complex boron compound is Na and wherein x of said complex boron compound is one, said selected complex boron compound being the compound $NaBD_4$, and wherein said trivalent metal oxide is $Al_2O_3$.

6. A method for producing chemically pure hydrogen or deuterium having a temperature of about 600°C to about 700°C from an initiated reaction that is self-sustaining, said method comprising:

i. combining a stoichiometric amount of a trivalent metal oxide of the general formula $Q_2O_3$, where Q is a trivalent metal selected from iron, aluminum, cobalt, gallium, and indium and where said trivalent metal oxide has been rendered moisture free by drying at a temperature at least 10 percent above that temperature needed to remove water of hydration, with a stoichiometric amount of a complex boron compound selected from the complex boron compounds having the formula: $M(BH_4)_x$ and $M(BD_4)_x$, wherein x is the valence of the metal (M), M is an alkali metal or an alkali earth metal, H is hydrogen, and D is deuterium, said stoichiometric amount being based on the reaction ratios of the reactants in the following representative equation:

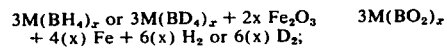

ii. mixing to achieve a uniform mixture of said trivalent metal oxide and said complex boron compound selected;

iii. forming said mixture into a pellet by pressing in a die while using a pressure of up to about 10,000 psig;

iv. placing said pellet in a sealable combustion apparatus adapted for operating under vacuum or pressure, said pellet being placed in electrical contact with an ignition wire comprised of about 80 weight percent nickel and of about 20 weight percent chromium;

v. purging said combustion apparatus to remove all the air and water vapor; and thereafter, vi. supplying an amount of electrical energy to produce sufficient heat to initiate a reaction which is a self-sustaining reaction whereby said hydrogen or deuterium is produced until said reaction is completed.

7. The method of claim 6 wherein said amount of electrical energy supplied is equivalent to about 10 volts at about 10 amperes and wherein said complex boron compound selected produces said hydrogen.

8. The method of claim 6 wherein said amount of electrical energy supplied is equivalent to about 10 volts at about 10 amperes and wherein said complex boron compound selected produces said deuterium.

* * * * *